April 16, 1929.  W. L. DEWEY  1,709,525

COMBINATION AUTO LOCK

Filed March 22, 1927

William L. Dewey, Inventor

Witnesses
C. E. Churchman

By Richard B. Owen
Attorney

Patented Apr. 16, 1929.

1,709,525

UNITED STATES PATENT OFFICE.

WILLIAM L. DEWEY, OF TACOMA, WASHINGTON.

COMBINATION AUTO LOCK.

Application filed March 22, 1927. Serial No. 177,275.

This invention relates to automobile appliances and more particularly to a novel lock for the steering gear of motor vehicles.

One of the primary objects of this invention is to provide a lock carried directly by the steering column of an automobile for permitting the expeditious locking of the steering wheel shaft, so that unauthorized persons will be prevented from taking the vehicle by reason of their inability to steer the vehicle.

Another salient feature of the invention is to provide a combination steering wheel lock embodying a casing connected directly with the steering column and a locking bolt connected with the casing for projection into and out of locking engagement with the steering wheel shaft, the bolt being held in a locked position by locking rings rotatably associated with the casing and mounted about the locking bolt, the rings having means for permitting the proper alinement thereof, to allow the bolt to be slid to an inoperative position out of engagement with the steering wheel shaft.

A still further object of the invention is to provide a combination lock for steering wheels of the above character which will be durable and efficient in use, one that will be simple and easy to manufacture, and one which can be placed upon the market and incorporated with a conventional steering column at a small cost.

Figure 1:
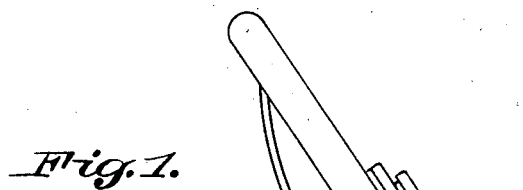
Figure 2:
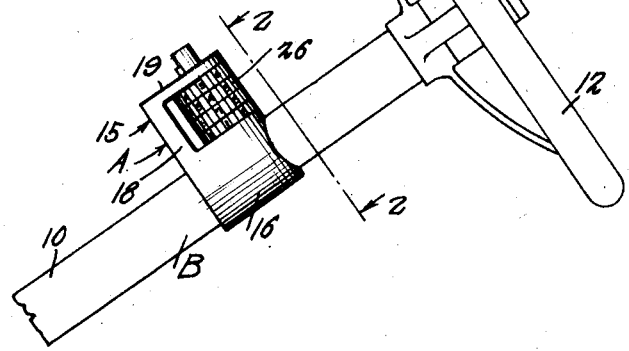

With these and other objects in view, the invention consists in the novel construction, arrangement and formation of parts, as will be hereinafter more specifically described, claimed, and illustrated in the accompanying drawing, in which drawings:

Figure 1 is a side elevation of a steering wheel column showing the improved combination lock associated therewith, Figure 2 is a transverse section of the column taken on the line 2—2 of Figure 1 looking in the direction of the arrows showing the combination lock in top plan.

Figure 3:
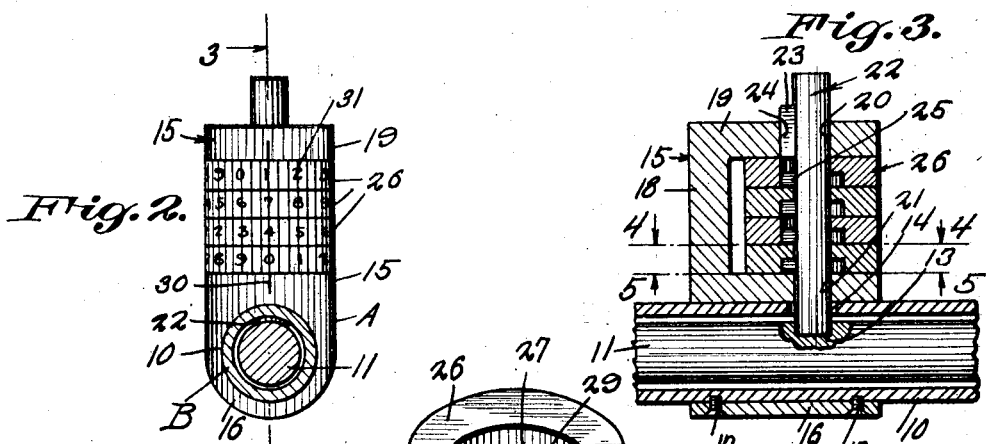
Figure 4:
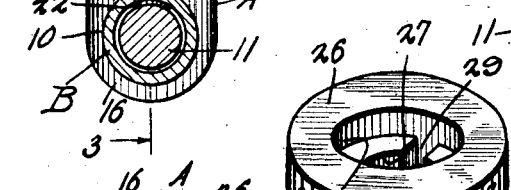
Figure 5:
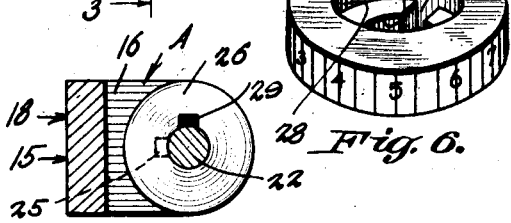
Figure 6:
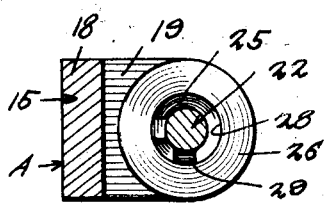

Figure 3 is a longitudinal section taken on the line 3—3 of Figure 2 looking in the direction of the arrows illustrating the means of associating the combination lock with the steering column and the construction of the lock, Figure 4 is a detail section through the combination lock taken on the line 4—4 of Figure 3 looking in the direction of the arrows, Figure 5 is a detail section through the lock taken on the line 5—5 of Figure 3 looking in the direction of the arrows, and Figure 6 is a perspective view of one of the novel locking rings.

Referring to the drawings in detail, wherein similar reference characters designate corresponding parts throughout the several views, the letter A generally indicates the improved combination lock and B the steering column, with which the same can be associated.

The steering column B is of the usual or any preferred conventional construction and includes the rigid shell 10 and the rotatable steering shaft 11 to which is secured the steering wheel 12. The shell 10 is rigidly connected with the chassis of the vehicle, (not shown) in any desired way.

The improved combination lock A for the steering column B comprises a casing 15 having a sleeve 16 formed integral therewith at one end thereof for receiving the shell 10. This sleeve can be secured to the shell 10 in any preferred way, such as by spot welding or the like and as shown, suitable fastening elements 17 are provided for that purpose.

In accordance with this invention the steering shaft 11 and the shell 10 are provided respectively with a notch or recess 13 and an opening 14. If preferred the steering shaft 11 can be provided with one or more openings, so that the same can be locked in any desired position. However when the shaft is to be locked against turning movement one of the notches must be in alinement with the opening 14 in the shell.

The casing 15 is provided with the laterally extending arm 18 formed on the sleeve at one end, and a head 19 on the arm lying parallel with the sleeve 16. The head 19 and the sleeve 16 are provided with alined openings 20 and 21 respectively through which is adapted to project the cylindrical locking bolt 22. The locking bolt 22 can be provided with a radially extending elongated lug 23, which is slidably mounted within a groove 24 formed in the wall of the opening 20.

The bolt 22 is further provided with spaced radially extending locking lugs 25 which are arranged in longitudinal alinement with the lug 23 and these locking lugs 25 cooperate with the locking rings 26 for holding the bolt 22 in a locked position.

There may be as many locking rings 26 as desired and in the present instance I have shown four of such rings. These rings are mounted between the sleeve 16 and the head 19 for rotation about the bolt 22 and each ring is provided with an axial bore 27. The bore 27 of each ring 26 is enlarged at one face of the ring as at 28 to provide a raceway for the locking lugs 25, so that the rings can be freely turned about the locking bolt 22. A vertically extending way 29 is also formed in the bore 27 for communication with the raceway or enlarged portion 28 of the bore, so that when the ring is disposed in a predetermined position, the way 29 will aline with the locking lugs so as to permit longitudinal movement of the locking bolt.

The casing 15 is provided with indicating points 30 and the rings are graduated and marked around their periphery with suitable indicating means, such as consecutive numbers 31. The ways 29 in each ring is arranged adjacent to a particular number, known to the operator of the vehicle and when these known numbers are disposed in direct alinement with the indicating marks 30, all of the ways 29 will be in alinement with one another and with the locking lugs 25, which will permit the free longitudinal movement of the bolt, whereby the bolt can be moved out of locking engagement with the walls of the notch 13. This will permit the free steering of the vehicle.

When it is desired to lock the steering gear against turning movement it is merely necessary to slide the bolt 22 inward until the same comes into locking engagement with the notch 13, after which the locking rings 21 are turned to occupy the various positions, so that persons unfamiliar with the combination will be prevented from alining the ways 29 and thus operating the bolt.

From the foregoing description, it can be seen that I have provided a novel combination lock for the steering column of an automobile, and like vehicles which will be easy to operate and which will not become suddenly out of order and which will be entirely fool and burglar proof.

Changes in details may be made without departing from the spirit or scope of this invention, but:

What I claim as new is:

A combination lock for steering columns comprising a steering column receiving sleeve, a laterally projecting arm on one end of the sleeve, a head formed on the arm lying parallel with the sleeve, the sleeve and head having aligned openings, a locking bolt slidably mounted in said aligned openings, radially extending locking lugs on the bolt arranged in equidistantly spaced relation longitudinally of the bolt, locking rings disposed between the sleeve and head and rotatably mounted upon said bolt, each of the rings including an annular raceway for receiving the lugs and a longitudinally extending way communicating with the raceway for permitting movement of the lugs out of the raceway, and a longitudinally extending elongated guide lug formed on the locking bolt in longitudinal alignment with the locking lugs, the head having a radially extending notch communicating with the opening therein for receiving said guide lug, said lug and notch constituting means for preventing turning movement of the bolt in the openings in the head and sleeve.

In testimony whereof I affix my signature.

WILLIAM L. DEWEY.